（12） United States Patent
Crockett et al.

(10) Patent No.: US 8,559,610 B2
(45) Date of Patent: Oct. 15, 2013

(54) METHOD AND APPARATUS FOR ALLOCATING NETWORK RESOURCES IN A GROUP COMMUNICATION SYSTEM

(75) Inventors: Douglas M. Crockett, San Diego, CA (US); Sacchindrakumar Gopikisan Kalantri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1354 days.

(21) Appl. No.: 11/609,994

(22) Filed: Dec. 13, 2006

(65) Prior Publication Data

US 2008/0144525 A1 Jun. 19, 2008

(51) Int. Cl.
*H04M 3/42* (2006.01)
*H04L 12/16* (2006.01)

(52) U.S. Cl.
USPC ...................................... 379/202.01; 370/261

(58) Field of Classification Search
USPC ......... 370/260, 352, 353, 354, 355, 356, 357; 379/202.01, 158, 225, 221.07, 114, 379/221.01, 221.06, 271, 272, 273, 203.01, 379/204.01, 205.01, 206.01; 709/223, 246, 709/203, 204, 205, 206, 207; 455/416, 432, 455/435, 436, 437, 438, 439, 440, 445, 452, 455/453
See application file for complete search history.

(56) References Cited

U.S. PATENT DOCUMENTS

| | | | |
|---|---|---|---|
| 6,477,150 B1 | 11/2002 | Maggenti | |
| 6,584,076 B1 | 6/2003 | Aravamudan et al. | |
| 6,687,234 B1 * | 2/2004 | Shaffer et al. | 370/260 |
| 6,928,294 B2 | 8/2005 | Maggenti | |
| 7,437,170 B2 | 10/2008 | Dunn et al. | |
| 7,826,603 B1 * | 11/2010 | Denman et al. | 379/202.01 |
| 2004/0008680 A1 * | 1/2004 | Moss et al. | 370/390 |
| 2004/0028019 A1 | 2/2004 | Mikami | |
| 2004/0034723 A1 * | 2/2004 | Giroti | 710/8 |
| 2004/0131042 A1 * | 7/2004 | Lillie et al. | 370/351 |
| 2004/0170265 A1 * | 9/2004 | Benco et al. | 379/202.01 |

(Continued)

FOREIGN PATENT DOCUMENTS

| | | | |
|---|---|---|---|
| JP | 3245690 A | 11/1991 | |
| JP | 8195820 A | 7/1996 | |

(Continued)

OTHER PUBLICATIONS

International Preliminary Report on Patent Ability, PCT/US2007/086960, European Patent Office Feb. 20, 2009.

(Continued)

*Primary Examiner* — Mohammad Islam
*Assistant Examiner* — Kharye Pope
(74) *Attorney, Agent, or Firm* — Robert O'Connell; Raphael Freiwirth

(57) ABSTRACT

Methods, devices, apparatus, computer-readable media and processors are provided for allocating network resources in a group communication system based on one or more call control rules. Call control rules may utilize one or more call control decision parameters including, but not limited to, the location of the group call members, the cost of the communication link and/or network resource options, the network load of the communication link options and the security status and/or priority status of the group call and/or the group call members. By basing allocation of the network resources on one or more of the call control decision parameters, the group communication call may experience improved latency and call cost, and/or may be assigned the requisite call security and/or call priority.

38 Claims, 4 Drawing Sheets

(56) References Cited

U.S. PATENT DOCUMENTS

| | | | |
|---|---|---|---|
| 2004/0190702 A1* | 9/2004 | Mayer et al. | 379/202.01 |
| 2004/0210637 A1* | 10/2004 | Loveland | 709/204 |
| 2005/0021713 A1* | 1/2005 | Dugan et al. | 709/223 |
| 2005/0031110 A1* | 2/2005 | Haimovich et al. | 379/202.01 |
| 2005/0059397 A1* | 3/2005 | Zhao | 455/435.2 |
| 2005/0108325 A1* | 5/2005 | Ponte | 709/203 |
| 2005/0136949 A1* | 6/2005 | Barnes, Jr. | 455/461 |
| 2005/0238156 A1* | 10/2005 | Turner | 379/202.01 |
| 2006/0008065 A1* | 1/2006 | Longman et al. | 379/158 |
| 2006/0031294 A1* | 2/2006 | Poikselka | 709/204 |
| 2006/0039364 A1* | 2/2006 | Wright | 370/352 |
| 2006/0045030 A1* | 3/2006 | Bieselin | 370/260 |
| 2006/0116149 A1 | 6/2006 | Dunn et al. | |
| 2006/0166643 A1* | 7/2006 | Puthenpura et al. | 455/406 |
| 2007/0036317 A1* | 2/2007 | Shaffer et al. | 379/202.01 |
| 2007/0041366 A1* | 2/2007 | Vugenfirer et al. | 370/352 |
| 2007/0047479 A1* | 3/2007 | Shaffer et al. | 370/328 |
| 2007/0061398 A1* | 3/2007 | Forssell | 709/204 |
| 2007/0073805 A1* | 3/2007 | Jorgensen | 709/203 |
| 2007/0086582 A1* | 4/2007 | Tai et al. | 379/114.01 |
| 2007/0133435 A1* | 6/2007 | Eneroth et al. | 370/260 |
| 2007/0195943 A1* | 8/2007 | Freeny et al. | 379/225 |
| 2008/0063173 A1* | 3/2008 | Sarkar et al. | 379/202.01 |
| 2008/0319857 A1* | 12/2008 | Dobbins et al. | 705/14 |
| 2009/0323561 A1 | 12/2009 | Croak et al. | |

FOREIGN PATENT DOCUMENTS

| | | |
|---|---|---|
| JP | 2000253156 A | 9/2000 |
| JP | 2003069563 A | 3/2003 |
| RU | 2005112269 | 9/2005 |
| WO | WO2004030398 | 4/2004 |
| WO | 2006033938 | 3/2006 |

OTHER PUBLICATIONS

International Search Report—PCT/US07/086960—International Search Authority—European Patent Office—Jun. 23, 2008.
Written Opinion—PCT/US07/086960—International Search Authority—European Patent Office—Jun. 23, 2008.
Office Action dated Jan. 23, 2009 in U.S. Appl. No. 11/506,594.
Office Action dated Jun. 25, 2009 in U.S. Appl. No. 11/506,594.
Translation of Office Action in Russian application 2009126605 corresponding to U.S. Appl. No. 11/609,994, citing WO2006033938A2, US20060116149, RU2005112269 and US6687234 dated Feb. 28, 2011.

* cited by examiner

METHOD AND APPARATUS FOR ALLOCATING NETWORK RESOURCES IN A GROUP COMMUNICATION SYSTEM

BACKGROUND

The described aspects relate to group communication systems. More specifically, to the allocation of network resources, such as group communication controllers and the like, in a group communication system.

Group communication systems, such as point to multipoint communication systems have recently been implemented in wireless communication clients as an alternate means of communicating audio, video, multimedia and the like. Such systems, which are commonly referred to as push-to-talk systems, allow for a group of individuals to communicate with other members of a defined communication group. Typically, a push-to-talk system relies on a single frequency, or broadcast channel, over which communications are received by the wireless communication clients. In most systems, only one group member may transmit information to the other members at any given time. However, all members can listen to the dedicated broadcast channel to receive communications from the single member who is transmitting. Members desiring to transmit to other members of the group communication call typically send an access request by depressing a push-to-talk button on their respective communication client that allows the user sole access to the dedicated channel.

Recently, push-to-talk group communication has been implemented on wireless communication clients using Voice-Over Internet Protocol (VOIP) architecture on standard IP-based data communication networks, such as $3^{rd}$ Generation Code Division Multiple Access (3G CDMA) networks and the like. Voice information is sent in digital form over the network in discrete packets rather than traditional circuit-switched packets of the Public Switched Telephone Network (PSTN).

In the VOIP example, a group communication call is established by having one member of the group initiate a call. The initiation communication is received by a communication manager server, which in turn dispatches and registers other participating members of the group. Once the group call has been established the communication manager server combines the separate point-to-point connection between each IP endpoint (i.e., communication client) and the managing or controlling entity, typically the communication manager server that resides closest in proximity to the call initiator. For a detailed discussion of group communication implemented in an IP-based network, see U.S. Pat. No. 6,477,150, entitled "System and Methods for Providing Group Communication Services in an Existing Communication System", issued Nov. 5, 2002, in the name of inventors Maggenti et al. and U.S. Pat. No. 6,928,294, entitled "Methods and Apparatus for Enabling Group Communications in an Existing Communication System", issued Aug. 9, 2005, in the name of inventors Maggenti et al. Both of these patents are herein incorporated by reference as if setforth fully herein.

Examples of uses of push-to-talk system include work-group communication, security communications, construction site communication, military communications and the like. In today's communication environment, members of group communication "nets" may be dispersed throughout regions of a Wide Area Network (WAN). For example, in the work-group communication scenario, members may be located at any work site world wide, and in the military communication example, members may be located in Washington D.C., the Middle East or at any other location with military personnel.

As previously noted, group communication calls are typically set-up and controlled by network resources located proximate to the call initiator. In instances in which the group is widely dispersed over a large geographic region, such as throughout North America or throughout the world, control of the call by the communication manager server closest to the call initiator may result in transport of the communication over numerous long haul links in the network. Such long haul links invariably add latency to the group communication; i.e., an increase in the response time between when a communication is sent and when it is received. Latency is also affected by the network traffic (i.e., the network load) incurred across the chosen communication links. In addition to latency concerns, controlling the group call at network resources that are proximate the call initiator does not take into account the costs related to the communication links or the network resources.

In addition to concerns over latency and call costs, managing/controlling the call by network resources proximate the call initiator may not take into account necessary security measures and/or call or caller priority status. Both security and call/caller priority are typically paramount concerns in group communication calls, especially in instances such as military communication, public safety communication, medical communication or the like.

Therefore a need exists to provide for methods, systems and devices that allocate network resources for the purpose of controlling group communication calls based on various call control parameters. As discussed these parameters may include, but are not limited to, one or any combination of the geographical location of the call members, the cost of the communication links or network resources contemplated to be used during the group communication call, the current or predicted network load across the contemplated communication links and the security status or priority status of the call members or the call. By developing a method/system that allocates network resources by taking into account one or more of the call control parameters, call control/management can effectively be implemented to reduce latency, reduce network load, reduce call costs and provide requisite call security or call priority.

SUMMARY

Thus, devices, methods, apparatus, computer-readable media and processors are presented that provide for the allocation of network resources in a group communication system based on one or more call control decision rules that rely on one or more call control parameters. Call control decision rules are typically dictated by the network characteristic that requires improvement, for example, Quality of Service (QoS), call latency, cost, etc. As such, the call control decision rules may be associated with one or any combination of the location of the clients and/or communication manager devices, the cost of the group call, network load, call security requirements, call priority requirements and the like. Thus, call control parameters may include, but are not limited to the location of the group call members, the cost of the communication link and/or network resource options, the network load of the communication link options and the security status and/or priority status of the group call and/or the group call members. By basing allocation of the network resources on one or more of the call control rules and associated parameters, the group communication call may experience improved latency and call cost, and/or may be assigned the requisite call security and/or call priority.

In one aspect a method for allocating network resources in a group communication network is defined. The method includes identifying group communication clients for participation in a group communication call and allocating network resources to the group communication call based on a predetermined call control decision rule that utilizes at least one predetermined call control decision parameter. The predetermined call control decision parameter may include, but are not limited to, the location of the participating group members, the location of a communication manager device, the cost associated with the network resource, the current or predicted network load and the priority and/or security status of the call and/or the call participants. The call control decision rule may take into account one or any combination of predetermined call control decision parameters in determining network resource allocation. In aspects in which two or more parameters are taken into account to determine allocation of network resources, the method may use a parameter weighting system or parameters may be prioritized. In aspects in which the rule involves location of the call participants, the resulting allocation of network resources may provide for the network resources to be allocated proximate the location of the most call participants, at a centralized location determined by the location of the call participants or designating allocation of multiple network resources, i.e., multiple peer communication manager servers based on the locations of call participants.

An alternate aspect is defined by a machine-readable medium that includes instructions which, when executed by a machine, cause the machine to perform operations. The operations include identifying group communication clients for participation in a group communication call, and allocating at least one of a plurality of network resources to the group communication call based on a predetermined call control decision rule utilizing at least one predetermined call control decision parameter.

A further related aspect includes at least one processor configured to perform the actions of identifying group communication clients for participation in a group communication call and allocating at least one of a plurality of network resources to the group communication call based on a predetermined call control decision rule utilizing at least one predetermined call control decision parameter.

In yet another aspect, a network device for allocating network resources for a group communication call is defined. The network device, such as a communication manager server or the like, includes a computer platform that includes a processing engine and a memory unit and a dispatch module stored in the memory unit and executed by the processing engine. The dispatch module includes call set-up logic operable for identifying group communication clients for participation in a group communication call and call control logic operable for allocating at least one of a plurality of network resources to the group communication call based on a predetermined call control decision rule utilizing at least one predetermined call control decision parameter.

A further aspect is encompassed by a system for allocating network resources for a group communication call. The system includes communication clients operable for participating in group communication calls, a plurality of network resources operable for controlling group communication calls, and a plurality of group communication manager devices, each in network communication with one or more communication clients. The group communication manager devices include a dispatch module that includes call set-up logic operable for identifying communication clients for participation in a group communication call and call control logic operable for allocating at least one of a plurality of network resources to the group communication call based on a predetermined call control decision rule utilizing at least one predetermined call control decision parameter.

Thus the present aspects provide for controlling many factors in a group communication call, such as, for example, call latency, call cost and call/caller priority or security status. Control of these factors is accomplished by taking into account one or more call control parameters in determining which network resources, such as communication manager servers and the like, are to be allocated for the control of a group communication call. Call control parameters include, but are not limited to, the location of the group communication participants, the cost associated with communication link and network resource options, the network load of communication link options and the requisite security status and/or priority status of the group communication call and/or group communication members.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors, however, may be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

Figure 1:
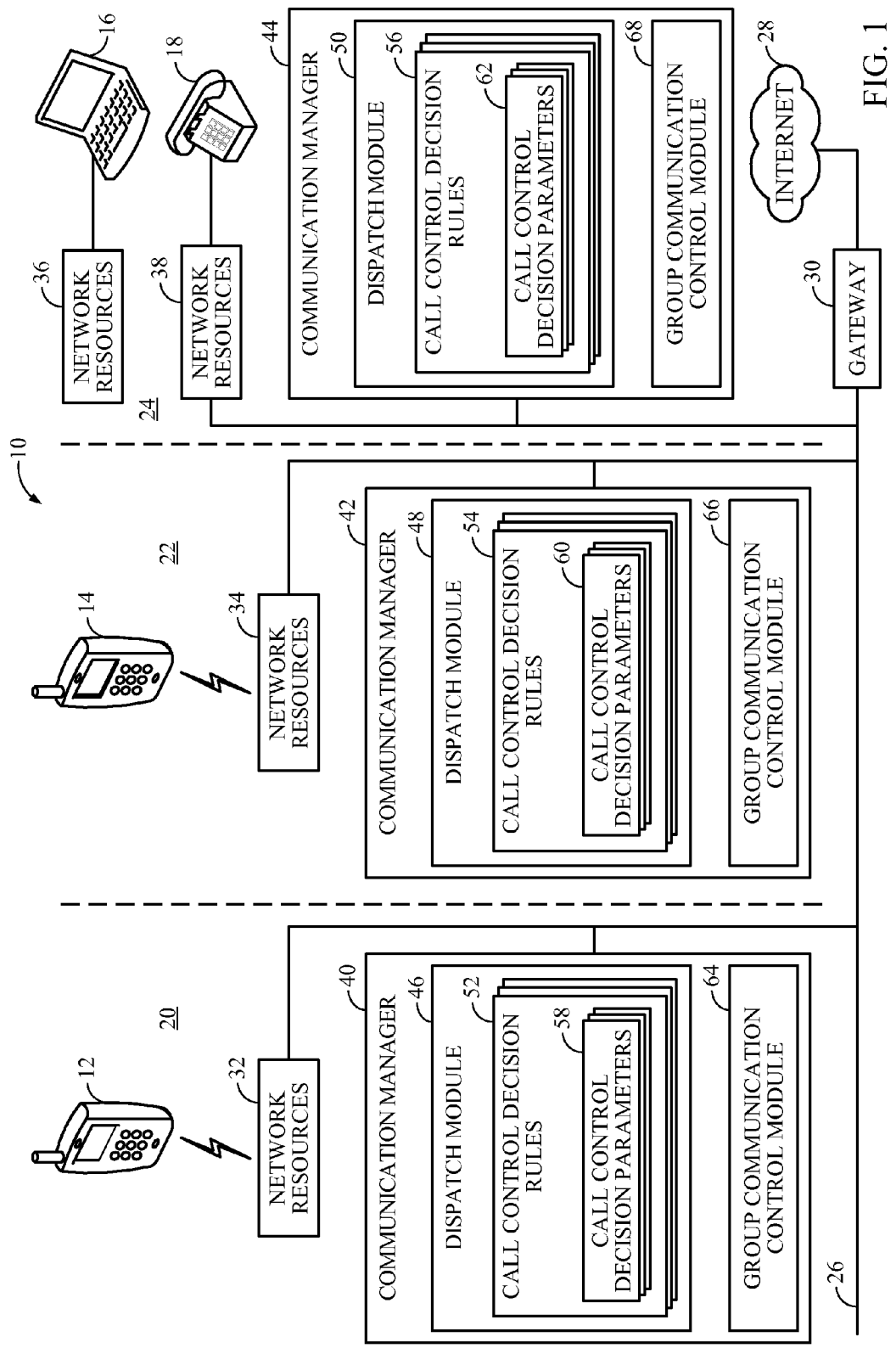
FIG. 1 is a block diagram of a system for allocating network resources in a group communication call network, according to one aspect.

FIG. 1 provides a block diagram illustration of an aspect of a system for allocating network resources in a group communication system. The group communication system 10, otherwise known as a push-to-talk system, a net broadcast system, a dispatch system or a point-to-multipoint communication system, is generally defined characteristically in that it provides for only one call participant to transmit information to other users at any given time. In group communication system 10, a group of communication client users, individually known as "net" members, communicate with one another using a communication client, such as wireless devices 12 and 14, computer 16 and landline telephone 18. It is noted that while group communication is widely used with wireless communication clients, such as cellular telephones, it may also be used in conjunction with wired devices, such as desktop computers, landline telephones and the like. Additionally, group communication clients may take the form of a wireless video camera, still cameras, audio devices, such as MP3 players, laptop computers, a paging device and the like or any combination of the aforementioned communication clients. As such, a group communication call may not be limited to the communication of voice data, but may include communication of other data, such as video data, multimedia data, text data and the like.

The communication clients 12, 14, 16 and 18 are configured to participate in group communication and, in the illustrated embodiment, the users of each of the communication clients are members of a group communication "net." The term "net" denotes a group of communication clients authorized to communicate with each other. In the illustrated embodiment, the communication clients are equipped with push-to-talk functionality or any other suitable group communication functionality. For a detailed discussion of push-to-talk functionality implanted in a Voice Over Internet Protocol (VOIP) architecture using a 3 Generation Code Division Multiple Access (3G CDMA) network, see U.S. Pat. No. 6,477,150, entitled "System and Methods for Providing Group Communication Services in an Existing Communication System", issued Nov. 5, 2002, in the name of inventors Maggenti et al., and U.S. Pat. No. 6,928,294, entitled "Methods and Apparatus for Enabling Group Communications in an Existing Communication System", issued Aug. 9, 2005, in the name of inventors Maggenti et al. As previously noted, both of these patents are herein incorporated by reference as if setforth fully herein.

In system 10, the communication clients may be physically located in distinct network regions or areas of group communication system 10. In one non-limiting example, wireless device 12 is located in first network region 20, wireless device 14 is located in second network region 22 and computer 16 and landline telephone 18 are located in third network region 24. Further, for example, first, second and third network regions 20, 22, and 24 are associated with Wide Area Network (WAN) 26 and are interconnected through Intranet 28 via one or more gateways, such as IP gateway 30. As used in this description, regions may be defined by a geographical area, and/or by one or more predetermined network resources 32, 34, 36 and 38 and/or communication managers 40, 42, and 44 that support group communication in a specified area.

Each region 20, 22 and 24 may include at least one communication manager, such as communication managers 40, 42 and 44, respectively. For example, the communication client that initiates the group communication call may initially communicate with a communication manager in their respective area. For instance, if wireless device 12 initiates the group communication call, initial communication may occur with communication manager 40, if wireless device 14 initiates the group communication call, initial communication may occur with communication manager 42, and if computer 16 or wired telephone 18 initiates the group communication call, initial communication may occur with communication manager 44. The communication manager may reside within a single network device or the communication manager may reside within a series of network devices. Each communication manager includes a dispatch module, such as dispatch modules 46, 48 and 50, respectively. The dispatch module may be operable for one or any combination of identifying the members of the group communication net, registering the participants of the call and, in accordance with present aspects, determining call control and allocation of network resources for the group communication call.

In some aspects, for example, one of dispatch modules 46, 48 and 50, respectively, may implement one or more predetermined call control decision rules 52, 54 and 56, respectively, which may utilize one or more call control decision parameters 58, 60 and 62, respectively, in order to determine which one or more of network resources 32, 34, 36 and 38, respectively, to utilize for the group call. For example, the predetermined call control decision rule 52, 54 and 56 may be determined and set by a service provider to optimize resource allocation based on one or more characteristics desired to be optimized. Alternatively, the call control decision rule may be selected by the communication manager 40, 42, and 44, respectively, based on predetermined characteristics associated with a call request, a call participant and/or a network resource. Examples of characteristics desired to be optimized include, but are not limited to, client location, network load, cost of the group call, priority allocated to the group call, security allocated to the group call and the like. The call control decision parameters, which may be either identified by the dispatch module or determined by the dispatch module, are implemented, depending upon the predetermined call control decision rule, in determining group call control and allocation of network resources for the group call.

In one aspect call control decision parameters 58, 60 and 62 may include the physical location of the communication clients that are registered to participate in the group communication call. For example, in some aspects, by identifying the location and/or the region associated with the communication client, the dispatch module 46, 48 or 50 can then determine based on a predetermined call control decision rules 52, 54 and 56 an optimal allocation of network resources for control of the group call that result in less overall latency in the call.

In another aspect, call control parameters 58, 60 and 62 may include the cost associated with communication link alternatives and/or network resource alternatives. By identifying the most cost efficient use of communication links and/or network resources, the dispatch module 46, 48 or 50 can then determine based on a predetermined call control decision rules 52, 54 and 56 an optimal allocation of network resources for control of the group call that result in less overall cost of the call.

In another aspect, call control parameters 58, 60 and 62 may include the current or predicted network load (i.e., communication traffic experienced by network resources and/or communication links). By identifying the current or predicted network resources or communication links having the least load, the dispatch module 46, 48 or 50 can determine based on a predetermined call control decision rules 52, 54 and 56 an optimal allocation of network resources for control of the group call that results in less overall latency in the call.

In another aspect, call control decision parameters 58, 60 and 62 may include the priority or security status of the group call or one or more group call participants. By identifying the priority or security status of the call or call members, the dispatch module 46, 48 or 50 can determine based on a predetermined call control decision rules 52, 54 and 56 an optimal allocation of network resources for control of the group call that provides the requisite level of security to the call or call participants or affords the call the requisite priority status in terms of cost, latency or the like.

The dispatch module may utilize one or more call control decision rules and one or more corresponding parameters in determining the control and allocation of network resources for the group communication call. If more than one rule and/or parameter is used to determine the call control and allocation of network resources, the dispatch module may use a weighting scheme or a priority scheme to determine the call control and allocation of network resources.

Once the dispatch module 46, 48 or 50 has determined call control and allocation of network resources, the dispatch module hands-off control of the call to the one or more group communication control modules, such as group communication control modules 64, 66 and 68. The assigned group communication control module or modules are responsible for one or any combination of setting up the group call, receiving the transmitted group call communication, re-broadcasting the communication to all the participating members of the group call and for all the group call management features. In addition to control of the call, network resources, such as network resources 32, 34, 36 and 38, are allocated to the group call and typically reside in the network region to which control of the call has been assigned. Network resources may include, but are not limited to; network based computational resources, network server devices, dedicated ports, dedicated bandwidth from communication links and the like.

Figure 2:
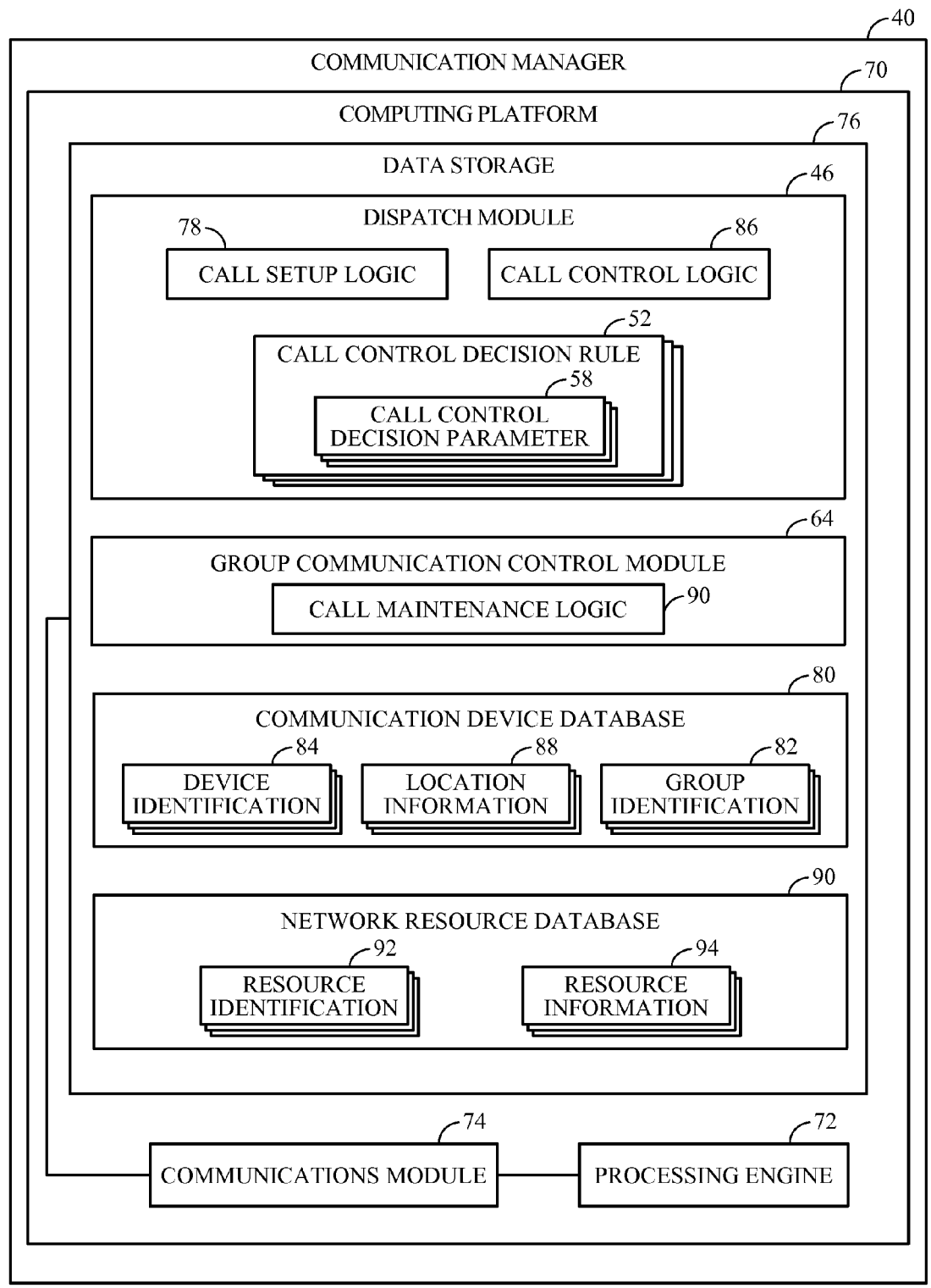
FIG. 2 is a block diagram of a communication manager for allocating network resources for control of a group communication call, according to another aspect.

FIG. 2 is a block diagram illustration of a communication manager, such as communication manager 40. As previously noted communication manager may comprise at least one of any type of network device, such as a server, personal computer, mini computer, mainframe computer, or any computing device either special purpose or general computing device having a computing platform 70, a processing engine 72, a communications module 74 and a memory, such as data storage 76. Alternatively, the communication manager may comprise more than one network device. Further, the modules, applications and logic described herein as being operated on or executed by the communication manager 40 may be executed entirely on a network device or alternatively, in other aspects, separate servers or computer devices may work in concert to provide data in usable formats to parties, and/or to provide a separate layer of control in the data flow between the communication clients and the modules and applications executed by communication manager 40.

Computer platform 70 includes a data storage 76, which may comprise volatile and nonvolatile memory such as read-only and/or random-access memory (RAM and ROM), EPROM, EEPROM, flash cards, or any memory common to computer platforms. Further, data storage 76 may include one or more flash memory cells, or may be any secondary or tertiary storage device, such as magnetic media, optical media, tape, or soft or hard disk. Further, computer platform 70 also includes a processing engine 72, which may be an application-specific integrated circuit ("ASIC"), or other chipset, processor, logic circuit, or other data processing device. The computer platform 70 may further include a communications module 74 embodied in hardware, firmware, software, and combinations thereof, that enables communications among the various components of the communication manager 40, as well as between the communication manager 40 and a wireless network or wired network. The communication module may include the requisite hardware, firmware, software and/or combinations thereof for establishing a wireless and/or wired communication connection.

The data storage 76 of communication manager 40 includes the dispatch module 46 that is operable for initiating a group communication call (i.e., verifying the group and determining the group members that are participating in the group call) and determining control of the group call. The dispatch module includes call set-up logic 78 that receives an initial group call request from a communication client, verifies the existence of the requested call group or sets up an ad hoc call group, identifies the members of the call group and registers members for participation in the group call. In this regard, the call set-up logic 78 may be operable to access communication device database 80 that includes relationships between group identification (ID) data 82 and device identification (ID) data 84 to verify the group and identify members of the group. Group ID data 82 may include an identifier, such as a name or code, associated with a call group. Device ID data 84 may include an identifier, such as a Mobile Identification Number (MIN), an Internet Protocol (IP) address, or the like, associated with a respective communication device. The dispatch module also includes call control logic 86 that determines an allocation of network resources and call control based on one or more predetermined call control decision rules 52 and one or more, corresponding, call control decision parameters 58. Call control decision parameters may include, but are not limited to, one or any combination of a location of the registered call members, a cost associated with network resources and/or communication links, a predicted or current network load experienced at the network resources or across communication links and the priority and/or security assigned to the group call or afforded members of the group call network. The call control logic 86 may be configured to identify and/or determine call control or network resource allocation based on call control decision rules 52 by accessing communication device database 80 that includes location information 88 which identifies a geographic and/or network location associated with a communication client, group identification 82 which may include group call priority information or security status information and/or device identification 84 for identifying group member/device priority or security status. The call control logic 86 may additionally be configured to identify and/or determine call control and network resource allocation based on call control decision rules 52 by accessing network resource database 90 that includes network resource identification data 92 and corresponding network resource information 94. Network resource identification data 92 may include, but is not limited to, an identifier, such as a name or code, of a given network resource. Network resource information 94 may comprise one or more characteristics associated with a respective network resource, for example corresponding to network resource identification data 92. For example, network resource information 94 may include, but is not limited to, one or any combination of network resource cost, current and/or predicted network resource load, network resource location, network resource priority, and network resource security level.

The communication manager additionally includes group communication control module 64 that is operable for controlling the group communication call. The group communication control module 64 is implemented if the call control logic 86 of dispatch module 46 determines that control of the call should be assigned locally to communication manager 40. In other instances, the group communication module 64 is implemented if control of the group call is transferred to communication manager 40 from another communication manager in the network. The group communication module 64 includes call maintenance logic 90 that is operable for receiving data from a transmitting group call member and re-broadcasting the data to all of the registered call members, arbitrating floor requests, and performing all other group call-related functions.

In accordance with aspects, the communication manager 40 may operate in the following detailed manner. The communication manager 40 receives a request for a group call. Typically, a group member that resides in a location proximate the communication manager 40 initiates the request for the group call. In some aspects, call set-up logic 78 accesses the group identification data 82 to verify the existence of the requested group and identify the members of the group. In other aspects, the request may identify one or more devices to be included in ad hoc call group. In any case, once the members of the group have been identified, the call set-up logic registers members for participation in the group communication call. Registering members for participation may include communicating with the identified members and determining if each member is available for participation in the group communication call. As such, the call set-up logic 78 may access the device identification data 84 to identify a means for communicating with the group members, such as a network IP address associated with a communication client or the like.

The dispatch module 46 additionally includes call control logic 86 operable for determining the network resources that are used to control/manage the group communication call. By qualitatively determining the optimal network resources for control of the group call, based on the given call control decision rule, the resulting call may experience improvements such as less latency, increased cost efficiencies and/or increased network load balancing efficiencies as compared to previous group call systems. The call control logic 86 relies on one or more predetermined call control decision rules 52 and one or more corresponding call control decision parameters 58 to determine the network resources that are used to manage the group call. As previously noted, call control decision rules 52, 54, 56 may be based on call control parameters 58, 60 and 62 such as the location of the group communication clients, the cost associated with network resources and/or communication links, the predicted or current load being experienced at the network resources or across communication links and the priority and/or security assigned to the group call or afforded members of the group call network. The call control logic 86 may determine allocation of network resources based on a single call control decision rule or it may determine allocation of network resources based on two or more call control decision rules. In instances in which two or more call control decision rules are implemented to determine allocation of network resources, the call control logic 86 may prioritize the rules and/or the parameters corresponding to the rules, or a rule-weighting and/or parameter-weighting scheme may be employed to determine the allocation of the network resources.

In one aspect, the call control decision parameters 58 include the location of the group communication clients registered to participate in the group communication call. By using the location of the registered group call participants as a call control decision parameter, network resources can be allocated that take into account call latency. As such, in aspects in which the call control decision rule 52 is based on communication client location, the call control logic may access the communication device database 80 that includes location information 88. Location information may be identified and stored in database 80 in conjunction with the member registration process conducted by the call set-up logic 78. In one aspect, the location information data 88 may be based on geographical location data provided by Global Positioning Sensors (GPS) or the like, a DNS (Domain Name System) value, a SID (System Identification Number), a NID (Network Identification Number), a packet zone identification, a network IP address or other network identifiers that can be associated with and/or identified from the communication that is sent by the communication clients. Alternatively, in other aspects the overall communication network may be partitioned into predefined regions and registration of group members may include assignment of each registered group member to a predefined region based on location identifying information supplied during the call registration process.

As noted in FIG. 1 the communication clients that participate in the group call may be wireless devices, such as wireless devices 12 and 14, or wired devices, such as personal computer 16 and landline telephone 18. The mobile aspect of the wireless devices means that the call members using such devices may change locations during the group call. For example, in the instance in which the call member is traveling in an automobile or in an airplane during the group communication call. Additionally, call members may join or leave the group call over time, necessitating a re-evaluation of the allocated resources. As such, the call control logic 86 may be configured to periodically re-assess the location of the registered call members throughout the duration of the group call. Re-assessing the location of the registered call members may occur by querying, in the form of pinging or the like, the communication clients during the group call to identify the location of the device. In those aspects in which the location of the communication clients are periodically re-assessed during the group call, allocation of the network resources that control/manage the call may also be re-assessed and reassigned according the configuration of the call control logic 86.

Once the location of each the registered group call members has been identified, the call control logic 86 may determine the allocation of network resources for control/management of the group communication call based on preconfigured allocation decision rules. Call control decision rules 52, 54 and 56 may be based on location, cost, security priority, call priority and the like.

In one aspect, the call control logic 86 is configured with a rule 52 that identifies the network region that includes the most registered call members and allocates network resources located in the identified network region. For example, if five (5) registered call members are located in a network region encompassing San Diego, Calif., thirteen (13) registered call members are located in a network region encompassed by Boston, Mass. and two (2) registered call members are located in the network region encompassing Denver, Colo., then the call control logic 86 may identify the Boston, Mass. network region as having the highest number of registered call members. Even though the group call may have been initiated in the San Diego, Calif. or Denver, Colo. network region, in this case the call control logic 86 determines that network resource allocation should be assigned to the Boston, Mass. network region.

In alternate aspects, the call control logic 86 may be configured with a call control decision rule 52 that identifies a centralized network region based on the identified location of the registered call members and allocate network resources to the centralized region. For example, if five (5) registered call members are located in a network region encompassing San Diego, Calif., five (5) registered call members are located in a network region encompassed by Boston, Mass. and four (2) registered call members are located in the network region encompassing Chicago, Ill., then the call control logic 86 may identify a network region encompassed by St. Louis, Mo. as the centralized network region and determine that network resources should be allocated to the centralized network region for control of the group call.

In another aspect, the call control logic 78 may be configured with a call control decision rule 52 that identifies multiple network regions for multiple allocations of network resources based on the location of the call participants. For example, if three hundred (300) registered call members are located in a network region encompassing Tokyo, Japan, and four hundred (400) registered call members are located in a network region encompassed by Boston, Mass., the call control logic may determine that network resources should be allocated to both the Tokyo, Japan network region and the Boston, Mass. network region, with the call members assigned to one of the two regions based on another determining parameter, such as location, cost, priority or the like.

In one aspect, the predetermined call control decision rule 52 may be based on parameters 58 that are related to call cost. As such, the call control decision parameters 58 may include the cost associated with network resources and/or communication links. By using cost information to determine allocation of network resources, group call cost efficiency may be realized. As such, in aspects in which the call control decision parameter 58 includes network resource cost information, the call control logic may access the network resource database 90 that includes network resource information 94. The network resource information 94 may include cost information related to network resources and/or communication links adjoining network resources. The call control logic 86 may use the network resource cost information to determine the most cost efficient allocation of network resources. In some aspects, the predefined call control decision rule 52 may be based solely on network resource cost information. In this case, network resources and call control may be placed within a network region without regard to the location of the group call participants. In other aspects, the call control decision rule 52 may be based on network resource cost information and the location of the group call participants and both of these parameters are used in determining allocation of network resources and call control management.

In other aspects, the predetermined call control decision rule 52 may be based on either the predicted or current network load experienced by network resources. Network load may be defined by bandwidth utilization, the number of calls connected through a network resource, the number of ports being utilized at a network resource or any other commonly used means of defining network load may be used. By using network load information to determine allocation of network resources, call latency can be minimized. Further, in aspects in which the call control decision parameter 58 includes predicted network load information, the call control logic 86 may be configured to access the network resource database 90 that includes network resource information 94. The network resource information 94 may include historical information related to network resource loads. The call control logic 86 may use the historical network resource load information to predict the load that may be experienced during the group communication call and determine allocation of network resources and call control based on predicted network resource loads. In other aspects, the call control logic 86 may be configured to poll the network resources to determine the current network load and to determine the allocation of network resources and call control based on the current network loads. In some aspects, the predefined call control decision rule 52 may be based on solely on network resource load information. In this case, network resources and call control may be placed within a network region without regard to the location of the group call participants and/or the cost of the network resources/communication links. In other aspects, the call control decision rule 52 may be based on network resource load information, network resource cost information and/or the location of the group call participants and all or some of these predefined parameters are used in determining allocation of network resources and call control management.

In another aspect, the predetermined call control decision rule 52 may be based on parameters 58 that are related to call priority or security status. As such, the call control decision parameters 58 may include priority or security status associated with either a group call or one or members of the group call network. Priority or security status afforded the group call and/or group call members may dictate that the call is controlled and network resources allocated that provide for the necessary call priority and/or call security. As such, in aspects in which the call control decision parameter 58 includes priority or security status information, the call control logic 86 may be configured to access the communication device database 80 that includes group identification information 82 and communication client information 84. The group identification information 82 and communication client information 84 may include call priority or security status and/or communication client/call member priority or security status. Additionally, the call control logic 86 may be configured to access the network resource database 90 that includes network resource information 94. The network resource information may include priority or security capabilities of potential network resources that may be considered for call allocation purposes. Additionally, call/client priority may also be transmitted in the call request itself, allowing the client to request a higher priority treatment on a call-by-call basis (for example, emergency call basis). The call control logic 86 may use the priority or security information to allocate network resources and call control based on the status of the call, the communication clients and/or call members. For example, if the group call and/or communication clients are assigned a high priority, the call control logic 86 may be configured allocate network resources and call control to insure that the call is not dropped and/or call latency is minimized. Alternatively, if the group call and/or communication clients are assigned a security status, the call control logic may be configured to allocate network resources and call control so as to insure security, such as by allocating network resources that provide for call encryption, call recording or the like.

In some aspects, the predefined call control decision rule 52 may be based on solely on priority or security status information. In this case, network resources and call control may be placed within a network region without regard to the location of the group call participants, the cost of the network resources/communication links and/or network resource load.

In other aspects, the call control decision rule 52 may be based on priority and/or security status information, network resource load information, network resource cost information and/or the location of the group call participants and all or some of these predefined parameters may be used in determining allocation of network resources and call control management.

In certain aspects, in which priority and or security status information is the basis for or is included within a call control decision rule, the call control logic 86 may be configured such that priority and/or security status may take priority over any other call control decision parameter within a call control decision rule.

Once the call control logic 86 has determined network resource allocation and call control management, the group call is transferred to the determined communication manager, which includes group communication control functionality, such as group communication control module 64. In some instances, if the call control logic 86 determines based on the call control decision rule and associated parameters that the call should be controlled locally and local network resources should be allocated then, the local communication control module 64 is granted control of the call and local network resources under the control of communication manager are allocated. In other instances, if the call control logic 86 determines based on the call control decision rule and associated parameters that the call should be controlled remotely and remote network resources should be allocated then, the dispatch module 46 transfers control of the call to a remote communication manager and remote network resources are allocated.

Figure 3:
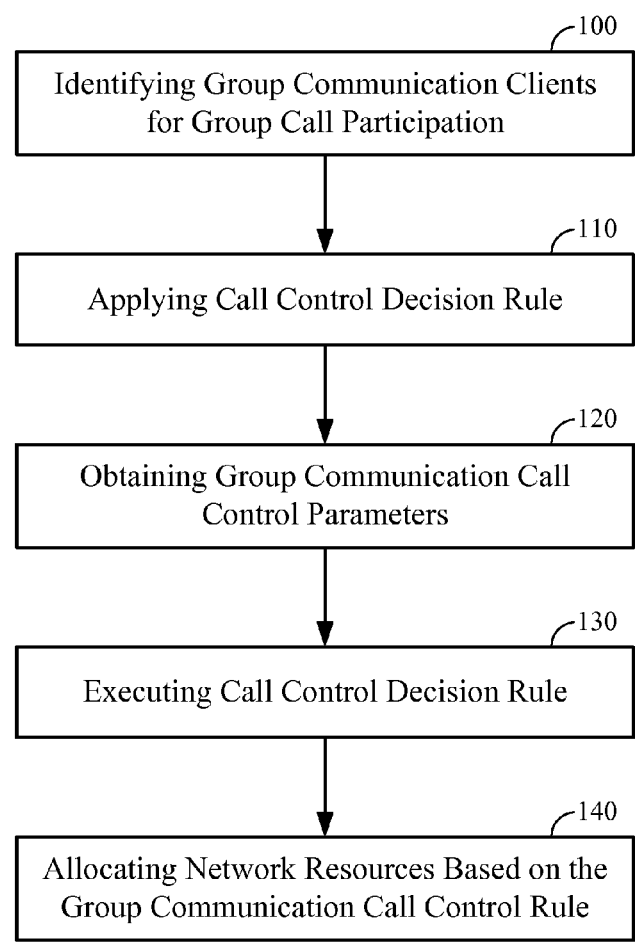
FIG. 3 is a high level flow diagram of a method for allocating network resources and call control in a group communication network, according to one aspect.

FIG. 3 provides a flow diagram of a method for allocating network resources in a group communication call network. At Event 100, a network device, such as a communication manager server or the like, identifies group communication clients for participation in a group communication call. Once the participating clients have been identified, at Event 110, the communication manager applies the predetermined call decision rule that will govern the allocation of network resources for the group call being initiated. In order to apply the rule to the call, the communication manager, at Event 120, obtains group communication call control parameters. Group communication control parameters are typically predefined and may configured for all group calls within the network or may be individually configured for each group within the network. In some aspects, the call control parameters are associated with the participating clients. For example, the call control rules may utilize parameters including the location of the participating clients, the priority or security status of the participating clients and/or the like. In other aspects, the call control parameters may be associated with the network resources. For example, the call control parameters may include the cost associated with using network resources or communication links, the current or predicted load associated with network resources and/or the like. The communication manager may access local or remote databases to retrieve information relevant to the predefined call control parameters. The database information may be directly used to determine the allocation of network resources or, in alternate aspects; the database information may used to logically determine information that is used to determine the allocation of network resources.

At Event 130, logic within the communication manager will execute the call control decision rule based on the previously obtained parameters associated with the rule. At Event 120, network resources are allocated based on the executed call control decision rule. Typically, the communication manager employs logic to determine what network resources should be allocated based on the predefined call control rules. For example, if the call control rules include the location of the clients, network resource allocation may be based on the physical location having the most participating clients, or network resource allocation may be based on a mean location of all participating clients or network allocation may be based on partitioning the allocation of network resources in multiple locations or any other logical allocation of network resources may be determined based on client location. In other aspects, the call control decision rule may rely on parameters such as network resource and/or communication link cost, network resource and/or communication link load, client and/or call priority or security status and the like may be used individually or in unison with the client location information or in any combination with other parameters to determine the allocation of network resources. Allocation of network resources may include assigning control/management of the call to a network device, such as a communication manager or the like, and allocating network resources that are within the network region controlled by the communication manager.

Figure 4:
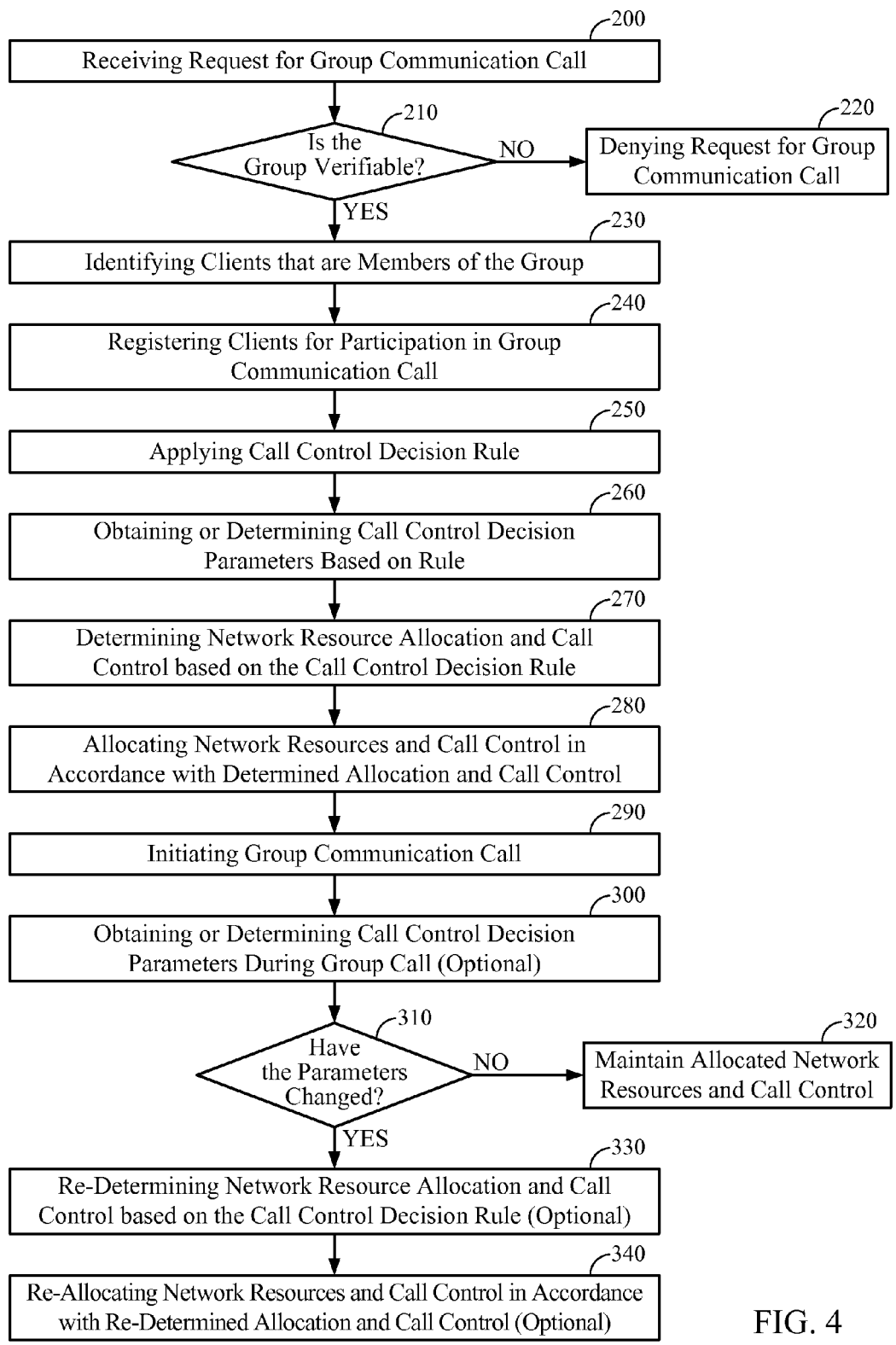
FIG. 4 is a flow diagram of a method for allocating network resources and call control in a group communication network, according to one aspect.

FIG. 4 provides a flow diagram of a method for allocating network resources in a group communication call network. At Event 200, a network device, such as a communications manager server or the like, receives a request to set-up a group communication call. The request is initiated by a communication client that is a participating member of the group call network. The client may be a wireless device that implements a group call communications application, such as push-to-talk or the like. Alternatively, the client may be a wired device, such as a landline telephone, desktop computer or the like, that implements a similar group communication application. Once the request for a group communication call has been received, at Decision 210, the communication manager determines if the group can be verified. Typically, verification provides for accessing a group database for verification of the existence of the group identified in the call request. If the group cannot be verified then, at Event 220, the group communication call is denied and, typically, the requesting client is notified of the call denial. Additionally, the communication manager may be configured to form an ad hoc communication group in the instance in which the group communication request does not include a verifiable group.

If the group in the requested call is verified then, at Event 230, the communication manager identifies the clients forming the group. Identifying the clients may involve cross-referencing the group identification to a look-up table that includes client numbers or client IP addresses. Once the clients in the group have been identified then, at Event 240, the communication manager registers clients for participation in the group call. Registering the clients typically involves sending a communication to the client and receiving a response from the client acknowledging that the client is available for participation in the ensuing group call.

Once the clients have been registered for participation in the group call, at Event 250, the communication manager applies a predefined call control decision rule. Call control decision rules may utilize parameters including, but not limited to, location of the clients, priority or security status of the clients and/or call, cost of using network resources and/or communication links, predicted or current load of network resources and/or communication links and the like. Thus, at event 260, the communication manager will obtain or determine call control decision parameters associated with the rule. To obtain call control decision parameters the communication manager may access, either locally or remotely, databases that include client data, such as location or security/priority status, or network resource data, such as cost information or load information. In other aspect, the communication manager may logically determine predefined call control decision parameters based on information communicated from the clients and/or information stored in client and/or network resource databases.

Once call control decision parameters have been obtained or determined, at Event 270, the communication manager executes the call control decision rule to determine network resource allocation and call control management based on the associated call control decision parameters. For example, if the applied rule is associated with client location, network resource allocation may be based on the region or network area having the most active call participants. Alternatively, network resource allocation may be based on a centralized network region or area that takes into account client locations or network resources may be allocated to more than one network region or area based on a high volume of clients participating in two or more network regions or areas. In addition to client location, other rules may be based on other parameters, such as network resource/link cost, network resource/link load, call/client priority and the like may be included within the predefined parameters and taken into account when determining network resource allocation and call control management. If more than two rules and/or parameters are used to determine network resource allocation, the communication manager may use a weighting system to determine allocation or the communication manager may prioritize the rules/parameters in order to determine allocation and call management control.

Once network resource allocation and call control management has been determined, at Event 280, allocation of network resource and call control management occurs. If the determination results in allocation of network resources and call control that is remote from the communication manager, call control is transferred to the determined remote communication manager that typically resides in another physical location within the communication network. Alternatively, if the determination results in local allocation of network resources and call control, call control may be accomplished at the communication manager that received the call request or another local network device and local network resources are allocated. At Event 290, the group call is initiated and transmitted communications are routed from the clients to the communication manager or other network device that has been determined as the call controller/manager. The call controller/manager receives the transmissions from the clients and re-broadcasts the transmissions to all clients participating in the group call.

At optional Event 300, the controlling communication manager or other network device may periodically, or based on the occurrence of predefined events, obtain or determine call control parameters during the group call. In certain instances, parameters may change during the course of a call and the change in the parameters may dictate re-execution of the call-control decision rule and possible re-allocating network resources. For example, if all the callers at one location exit the group call, the dynamics of the overall client location make-up changes and this change may warrant re-allocation of network resources and call control management to insure minimization of call latency or to maximize cost efficiencies. In another example, the mobile nature of some wireless clients provide for clients to be in transit, for example in an automobile or airplane, during the group call. As such, users may change location during the call and the change in location may warrant re-allocation of network resources and call control management to insure minimization of call latency or to maximize cost efficiencies. Thus, at Decision 310, a determination is made as to whether call control decision parameters have changed. If the parameters have not changed then, at Event 320, the allocation of network resources and call control management initially determined is maintained.

If the determination is made that parameters have changed then, at optional Event 330, the communication manager or other network device re-applies the call control decision rule to re-determine network resource allocation and call control based on the revised call control decision parameters. If the re-determination of network resource allocation determines that the network resources should be re-allocated and call control management changed then, at Event 340, re-allocation of network resources occurs and call control management occurs, on-the-fly during the group call, without adversely affecting the performance of the group call.

Thus the present aspects provide for controlling many factors in a group communication call, such as, for example, call latency, call cost and call/caller priority or security status. Control of these factors is accomplished by taking into applying a call control decision rule that is based on one or more call control parameters to determine which network resources, such as communication manager servers and the like, are to be allocated for the control of a group communication call. Call control decision rules may be associated with client location, network load, call cost, call priority, call security and the like. As such, call control parameters include, but are not limited to, the location of the group communication participants, the cost associated with communication link and network resource options, the network load of communication link options and the requisite security status and/or priority status of the group communication call and/or group communication members.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment.

What is claimed is:

1. A method for allocating network resources in a group communication network, the method comprising:
   identifying a plurality of group communication clients for participation in a group communication call;
   allocating at least one of a plurality of network resources to the group communication call based on a predetermined call control decision rule utilizing at least one predetermined call control decision parameter; and
   selecting at least one of a plurality of communication manager devices to control the group communication call,
   wherein at least two of the plurality of communication manager devices are operable to manage different ones of the plurality of network resources,
   and wherein the selecting step selects the at least one communication manager device to control the group communication call based upon (i) a priority associated with the group communication call, (ii) a priority associated with one or more of the plurality of group communication clients, and/or (iii) a security status associated with the group communication call.

2. The method for allocating of claim 1, further comprising allocating based on a predetermined call control decision rule that utilizes communication client location as at least one predetermined call control decision parameter.

3. The method for allocating of claim 2, further comprising allocating management of the group communication call to the at least one selected communication manager device, wherein the at least two selected communication manager device has associated manager location information closest in location to a majority of the communication clients.

4. The method for allocating of claim 2, further comprising allocating management of the group communication call to the selected communication manager device, the selected communication manager device having associated manager location information comprising a centralized location relative to the locations of the group communication clients.

5. The method for allocating of claim 2, further comprising allocating management of the group communication call to at least two communication manager devices selected from the plurality of communication manager devices based on the locations of the group communication clients.

6. The method for allocating of claim 5, further comprising assigning each of the group communication clients to one of the at least two selected communication manager devices based on the predetermined call control decision parameter.

7. The method for allocating of claim 6, wherein the predetermined call control decision parameter is chosen from the group consisting of location, cost, network load, priority and security.

8. The method for allocating of claim 1, further comprising allocating based on a predetermined call control decision rule that utilizes network resource cost information as at least one predetermined call control decision parameter.

9. The method for allocating of claim 1, further comprising allocating based on a predetermined call control decision rule that utilizes determined network load information as at least one predetermined call control decision parameter.

10. The method for allocating of claim 1, further comprising allocating based on a predetermined call control decision rule that utilizes predicted network load information as at least one predetermined call control decision parameter.

11. The method for allocating of claim 1, further comprising allocating based on a predetermined call control decision rule that utilizes call priority as at least one predetermined call control decision parameter.

12. The method for allocating of claim 1, further comprising allocating based on a predetermined call control decision rule that utilizes group call participant priority as at least one predetermined call control decision parameter.

13. The method for allocating of claim 1, further comprising allocating based on a predetermined call control decision rule that utilizes group call security information as at least one predetermined call control decision parameter.

14. The method for allocating of claim 1, further comprising allocating based on a predetermined call control decision rule that utilizes group call participant security information as at least one predetermined call control decision parameter.

15. The method for allocating of claim 1, further comprising allocating based on two or more predetermined call control decision parameters chosen from the group consisting of client location information, communication manager location information, network resource location information, network resource cost information, network load information, call priority information, call participant priority information, call security information and call participant security information.

16. The method for allocating of claim 15, further comprising allocating based on a predetermined call control decision rule that applies a weight to the two or more predetermined call control decision parameters.

17. The method for allocating of claim 15, further comprising allocating based on a predetermined call control decision rule that prioritizes the two or more predetermined call control decision parameters.

18. A non-transitory machine-readable medium comprising instructions which, when executed by a machine, cause the machine to perform operations, the instructions comprising:
   instructions to identify a plurality of group communication clients for participation in a group communication call;
   instructions to allocate at least one of a plurality of network resources to the group communication call based on a predetermined call control decision rule utilizing at least one predetermined call control decision parameter;
   instructions to select at least one of a plurality of communication manager devices to control the group communication call,
   wherein at least two of the plurality of communication manager devices are operable to manage different ones of the plurality of network resources,
   and wherein the instructions to select selects the at least one communication manager device to control the group communication call based upon (i) a priority associated with the group communication call, (ii) a priority associated with one or more of the plurality of group communication clients, and/or (iii) a security status associated with the group communication call.

19. At least one processor configured to perform the actions of:
   identifying a plurality of group communication clients for participation in a group communication call;
   allocating at least one of a plurality of network resources to the group communication call based on a predetermined call control decision rule utilizing at least one predetermined call control decision parameter; and
   selecting at least one of a plurality of communication manager devices to control the group communication call,
   wherein at least two of the plurality of communication manager devices are operable to manage different ones of the plurality of network resources,
   and wherein the at least one processor is configured to select the at least one communication manager device to control the group communication call based upon (i) a priority associated with the group communication call, (ii) a priority associated with one or more of the plurality of group communication clients, and/or (iii) a security status associated with the group communication call.

20. A network device for allocating network resources for a group communication call, the device comprising:
   a computer platform that includes a processing engine and a memory unit; and
   a dispatch module stored in the memory unit and executed by the processing engine, wherein the dispatch module includes call set-up logic operable for identifying a plurality of group communication clients for participation in a group communication call, call control logic operable for allocating at least one of a plurality of network resources to the group communication call based on a predetermined call control decision rule utilizing at least one predetermined call control decision parameter and call logic operable for selecting at least one of a plurality of communication manager devices to control the group communication call,
wherein at least two of the plurality of communication manager devices are operable to manage different ones of the plurality of network resources,
and wherein the call logic operable for selecting selects the at least one communication manager device to control the group communication call based upon (i) a priority associated with the group communication call, (ii) a priority associated with one or more of the plurality of group communication clients, and/or (iii) a security status associated with the group communication call.

21. The device of claim 20, wherein the at least one predetermined call control decision parameter is chosen from the group consisting of communication client location, communication manager device location, network resource cost information, network load information, call priority information, call participant priority information, call security information, and call participant security information.

22. The device of claim 20, further comprising a communications device database, and wherein the call control logic is further operable for obtaining at least one predetermined call control decision parameter from the communications device database.

23. The device of claim 20, further comprising a communications device database, and wherein the call control logic is further operable for determining at least one predetermined call control decision parameter based on information stored in the communications device database.

24. The device of claim 20, further comprising a network resource database, and wherein the call control logic is further operable for obtaining at least one predetermined call control decision parameter from the network resource database.

25. The device of claim 20, further comprising a network resource database, and wherein the call control logic is further operable for determining at least one predetermined call control decision parameter based on information stored in the network resource database.

26. The device of claim 20, further comprising a group communication control module stored in the memory unit and executed by the processing engine, wherein the group communication control module includes call maintenance logic operable for maintaining control of the group communication call as a result of allocation by the call control logic.

27. A network device for allocating network resources for a group communication call, the device comprising:
a means for processing data at the network device;
a means for storing data at the wireless device that is in communication with the means for processing data;
a means for identifying a plurality of group communication clients for participation in a group communication call;
a means for allocating at least one of a plurality of network resources to the group communication call based on a predetermined call control decision rule utilizing at least one predetermined call control decision parameter; and
a means for selecting at least one of a plurality of communication manager devices to control the group communication call,
wherein at least two of the plurality of communication manager devices are operable to manage different ones of the plurality of network resources,
and wherein the means for selecting selects the at least one communication manager device to control the group communication call based upon (i) a priority associated with the group communication call, (ii) a priority associated with one or more of the plurality of group communication clients, and/or (iii) a security status associated with the group communication call.

28. A system for allocating network resources for a group communication call, the system comprising:
a plurality of communication clients operable for participating in group communication calls;
a plurality of network resources operable for controlling group communication calls; and
a plurality of group communication manager devices, each in network communication with one or more communication clients, wherein at least one of the group communication manager devices includes a dispatch module that includes call set-up logic operable for identifying one or more of the plurality of communication clients for participation in a group communication call, call control logic operable for allocating at least one of a plurality of network resources to the group communication call based on a predetermined call control decision rule utilizing at least one predetermined call control decision parameter and call logic operable for selecting at least one of the plurality of group communication manager devices to control the group communication call,
wherein at least two of the plurality of group communication manager devices are operable to manage different ones of the plurality of network resources,
and wherein the call logic operable for selecting selects the at least one group communication manager device to control the group communication call based upon (i) a priority associated with the group communication call, (ii) a priority associated with one or more of the plurality of group communication clients, and/or (iii) a security status associated with the group communication call.

29. The system of claim 28, wherein the predetermined call control decision parameter is chosen from the group consisting of communication client location, communication manager device location, network resource cost information, network load information, call priority information, call participant priority information, call security information, and call participant security information.

30. The system of claim 28, further comprising a communication client device database that is in communication with the dispatch module and includes information related to client-based predetermined call control decision parameters.

31. The system of claim 30, wherein the information related to client-based predetermined call control decision parameters further comprises communication client location information.

32. The system of claim 30, wherein the information related to client-based predetermined call control decision parameters further comprises communication client priority status.

33. The system of claim 28, further comprising a network resource database that is in communication with the dispatch module and includes information related to network resource-based predetermined call control decision parameters.

34. The system of claim 33, wherein the information related to network resource-based predetermined call control decision parameters further comprises network resource cost information.

35. The system of claim 33, wherein the information related to network resource-based predetermined call control decision parameters further comprises network resource load information.

36. The method of claim 1, wherein the priority associated with the group communication call and/or the priority associated with the one or more of the plurality of group communication clients is received at the group communication network within a call request message requesting initiation of the group communication call.

37. The method of claim 1, wherein the plurality of network resources include network based computational resources, network server devices, dedicated ports and/or dedicated bandwidth from communication links.

38. The method of claim 1, wherein the selecting selects the at least one communication manager device to control an arbitration function of the group communication call.

* * * * *